United States Patent
Xing et al.

(10) Patent No.: US 11,294,966 B2
(45) Date of Patent: Apr. 5, 2022

(54) METHOD AND APPARATUS FOR PUSHING SEARCH RESULTS, AN APPARATUS AND NON-VOLATILE COMPUTER STORAGE MEDIUM

(71) Applicant: BAIDU ONLINE NETWORK TECHNOLOGY (BEIJING) CO., LTD., Beijing (CN)

(72) Inventors: Liang Xing, Beijing (CN); Yajie Li, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 671 days.

(21) Appl. No.: 15/534,452

(22) PCT Filed: Nov. 13, 2015

(86) PCT No.: PCT/CN2015/094527
§ 371 (c)(1),
(2) Date: Jun. 8, 2017

(87) PCT Pub. No.: WO2017/004921
PCT Pub. Date: Jan. 12, 2017

(65) Prior Publication Data
US 2017/0364592 A1     Dec. 21, 2017

(30) Foreign Application Priority Data
Jul. 6, 2015   (CN) .......................... 201510390587.6

(51) Int. Cl.
*G06F 16/30*   (2019.01)
*G06F 16/18*   (2019.01)
(Continued)

(52) U.S. Cl.
CPC ............ *G06F 16/951* (2019.01); *G06F 17/18* (2013.01)

(58) Field of Classification Search
CPC .............................. G06F 16/951; G06F 17/18
(Continued)

(56) References Cited

U.S. PATENT DOCUMENTS 7,693,836 B2*  4/2010  Brave ................ G06F 16/9535
                                                    707/603
8,515,816 B2*  8/2013  King .................. G06F 16/9554
                                                     705/26.5
(Continued)

FOREIGN PATENT DOCUMENTS

CN   101510199 A   8/2009
CN   101546334 A   9/2009
(Continued)

OTHER PUBLICATIONS

Church et al.: "Mobile Information Access: A Study of Emerging Search Behavior on the Mobile Internet", ACM Transactions on the Web, vol. 1, No. 1, Article 4, Publication date: May 2007 (Year: 2007).*

(Continued)

*Primary Examiner* — Kuen S Lu
(74) *Attorney, Agent, or Firm* — Ladas & Parry, LLP

(57) ABSTRACT

The present disclosure provides a method and apparatus for pushing search results, an apparatus and a non-volatile computer storage medium. The method comprises: performing real-time search according to the user's key word to obtain current search results; performing statistics of access heat of each content in the current search results; obtaining, from the current search results, content whose access heat meets heat requirements, as content to be pushed; pushing the content to be pushed to the user. According to the present (Continued)

disclosure, while the real-time search is implemented, the search results are screened according to the access heat, which facilitates reduction of the number of search results pushed to the user, and thereby reduces network resources consumed in pushing the search result to the user.

12 Claims, 1 Drawing Sheet

(51) Int. Cl.
*G06F 16/951* (2019.01)
*G06F 17/18* (2006.01)

(58) Field of Classification Search
USPC .......................................................... 707/706
See application file for complete search history.

(56) References Cited

U.S. PATENT DOCUMENTS

| | | | |
|---|---|---|---|
| 2011/0055191 A1* | 3/2011 | Bain .................. | G06F 16/83 707/706 |
| 2014/0108445 A1* | 4/2014 | Oztekin ............ | G06F 16/90324 707/767 |
| 2015/0178807 A1* | 6/2015 | Tiwari ............... | G06Q 30/0629 705/26.62 |
| 2015/0254714 A1* | 9/2015 | Zhuang ............. | G06F 16/3322 705/14.54 |
| 2016/0034555 A1* | 2/2016 | Rahut ................ | G06F 16/951 707/634 |

FOREIGN PATENT DOCUMENTS

| | | |
|---|---|---|
| CN | 101937437 A | 1/2011 |
| CN | 102799587 A | 11/2012 |
| CN | 103365858 A | 10/2013 |
| CN | 104239455 A | 12/2014 |
| CN | 104572717 A | 4/2015 |
| CN | 104657387 A | 5/2015 |
| CN | 104679820 A | 6/2015 |
| CN | 104978434 A | 10/2015 |

OTHER PUBLICATIONS

Cho et al.: "Impact of Search Engines on Page Popularity", WWW2004, May 17-22, 2004, New York, New York, USA. ACM 158113844X/04/0005. (Year: 2004).*
International Search Report for PCT/CN2015/094527, dated Apr. 12, 2016, and its English translation provided by WIPO.
Written Opinion of the International Search Authority for PCT/CN2015/094527, dated Apr. 12, 2016, and its English translation provided by Bing.Com Microsoft Translator.
First Office Action and Search Report from CN app. No. 201510390587.6, dated Dec. 11, 2017, with English translation provided by Global Dossier.
Second Office Action from CN app. No. 201510390587.6, dated Jun. 12, 2018, with machine English translation provided by Google Translate.
Third Office Action and Supplementary Search Report from CN app. No. 201510390587.6, dated Nov. 8, 2018, with English translation provided by Global Dossier.
Notification to Grant Patent Right for Invention from CN app. No. 201510390587.6, dated Apr. 4, 2019, with English translation provided by Global Dossier.
Written Opinion of the International Searching Authority from PCT/CN2015/094527, dated Apr. 12, 2016, with English translation from WIPO.
International Preliminary Report on Patentability from PCT/CN2015/094527, dated Jan. 9, 2018, with English translation from WIPO.

* cited by examiner

METHOD AND APPARATUS FOR PUSHING SEARCH RESULTS, AN APPARATUS AND NON-VOLATILE COMPUTER STORAGE MEDIUM

CROSS REFERENCE TO RELATED APPLICATIONS

The present application is the U.S. national phase of PCT Application PCT/CN2015/094527 filed on Nov. 13, 2015, which claims priority to the Chinese patent application No.201510390587.6 entitled "Method and Apparatus for Pushing Search Results" filed on Jul. 6, 2015, the disclosures of which are hereby incorporated by reference in their entireties.

FIELD OF THE DISCLOSURE

The present disclosure relates to the technical field of Internet technologies, and particularly to a method and apparatus for pushing search results, an apparatus and a non-volatile computer storage medium.

BACKGROUND OF THE DISCLOSURE

As Internet applications prevail, spread and penetrate into people's life, users are no longer satisfied with obtaining desired information through the Internet, and they tend to hope that the desired information can appear before their eyes in time. Therefore, there arises entity-searching technology in conjunction with pushing. The entity-searching technology means that the user inputs a key word, and a search engine searches for the key word according to a fixed frequency and pushes search results to the user.

In the above solution, the search engine needs to frequently push search results to the user, so this seriously wastes the user's network resources.

SUMMARY OF THE DISCLOSURE

A plurality of aspects of the present disclosure provide a method and apparatus for pushing search results, an apparatus and a non-volatile computer storage medium, to reduce network resources consumed by pushing the search results to the user.

According to an aspect of the present disclosure, there is provided a method for pushing search results, comprising:
performing real-time search according to the user's key word to obtain current search results;
performing statistics of access heat of each content in the current search results;
obtaining, from the current search results, content whose access heat meets heat requirements, as content to be pushed;
pushing the content to be pushed to the user.

According to another aspect of the present disclosure, there is provided an apparatus for pushing search results, comprising:
a searching module configured to perform real-time search according to the user's key word to obtain current search results;
a statistics module configured to perform statistics of access heat of each content in the current search results;
an obtaining module configured to, from the current search results, content whose access heat meets heat requirements, as content to be pushed;
a pushing module configured to push the content to be pushed to the user.

According to a further aspect of the present disclosure, there is provided an apparatus, comprising
one or more processors;
a memory;
one or more programs stored in the memory and configured to execute the following operations when executed by the one or more processors:
performing real-time search according to the user's key word to obtain current search results;
performing statistics of access heat of each content in the current search results;
obtaining, from the current search results, content whose access heat meets heat requirements, as content to be pushed;
pushing the content to be pushed to the user.

According to a further aspect of the present disclosure, there is provided a non-volatile computer storage medium in which one or more programs are stored, an apparatus being enabled to execute the following operations when said one or more programs are executed by the apparatus:
performing real-time search according to the user's key word to obtain current search results;
performing statistics of access heat of each content in the current search results;
obtaining, from the current search results, content whose access heat meets heat requirements, as content to be pushed;
pushing the content to be pushed to the user.

In the present disclosure, real-time search is performed according to the user's key word and a search result is pushed to the user, and the user may obtain the desired information in time. In this procedure, statistics is performed for the access heat of each content in the current search results, content whose access heat meets the heat requirement is obtained from the current search results and pushed to the user as the pushed content, and this is equivalent to screening the search results. This may reduce the number of search results pushed to the user, reduce network resources consumed in pushing the search result to the user, and facilitate the saving of the user's network resources.

BRIEF DESCRIPTION OF DRAWINGS

To describe technical solutions of embodiments of the present disclosure more clearly, figures to be used in the embodiments or in depictions regarding the prior art will be described briefly. Obviously, the figures described below are only some embodiments of the present disclosure. Those having ordinary skill in the art appreciate that other figures may be obtained from these figures without making any inventive efforts.

DETAILED DESCRIPTION OF PREFERRED EMBODIMENTS

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments obtained by those having ordinary skill in the art based on the embodiments of the present disclosure, without making any inventive efforts, fall within the protection scope of the present disclosure.

Figure 1:
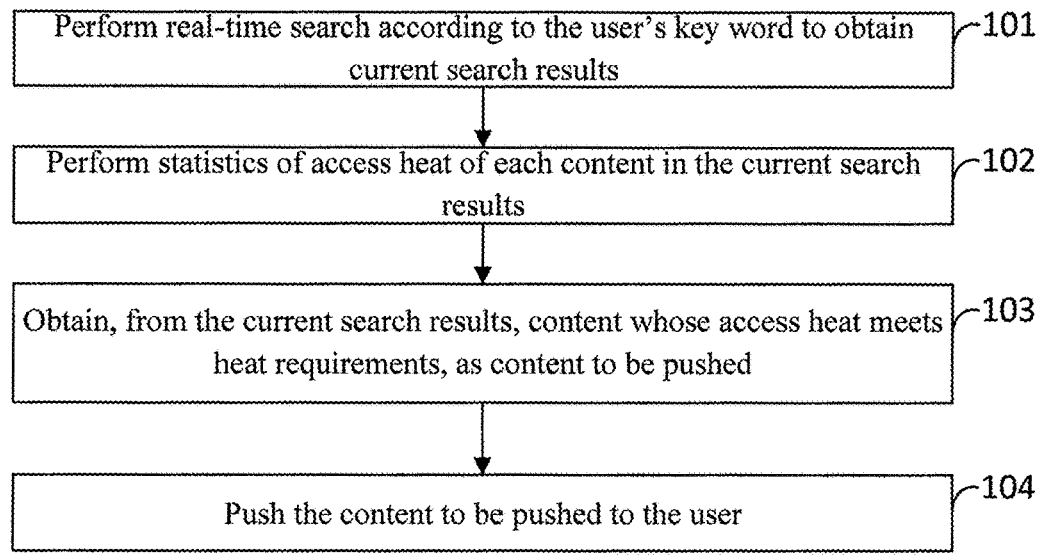
FIG. 1 is a flow chart of a method of pushing search results according to an embodiment of the present disclosure.

FIG. 1 is a flow chart of a method of pushing search results according to an embodiment of the present disclosure. As shown in FIG. 1, the method comprises:

101: performing real-time search according to the user's key word to obtain current search results.

102: performing statistics of access heat of each content in the current search results.

103: obtaining, from the current search results, content whose access heat meets heat requirements, as content to be pushed.

104: pushing the content to be pushed to the user.

In the present embodiment, the search engine performs real-time search according to the user's key word, and pushes the search results to the user so that the user obtains the desired information in time.

A mode of implementing real-time search is as follows: pre-setting a trigger condition for real-time search, and enabling the search engine to perform search according to the user's key word every time when the trigger condition for the real-time search is satisfied, wherein the trigger condition for the real-time search may be set adaptively according to specific application scenario. Illustration is presented by way of example.

For example, the trigger condition for the real-time search may be a preset search frequency. Based on this, the search engine cyclically performs search according to the preset search frequency and the user's key word to implement real-time search. By way of example, the search frequency may be searching once every two minutes, or every five minutes, or the like.

Again for example, the trigger condition for the real-time search may be a preset search times threshold in a unit time. Base on this, the search engine performs search not less than the search times threshold according to the user's key word in the unit time according to needs, to implement the real-time search. For example, the search times threshold in the unit time may be 10,000 times per hour or 200 times per minutes, or the like.

In addition, the trigger condition for the real-time search may further be some events, for example, the search frequency of the key word exceeds a threshold, or the user browses the current search results.

Since the real-time search needs to push the search results frequently to the user, which consumes the user's network resources such as traffic. Regarding this problem, in the present embodiment, after the search results are obtained by performing real-time search according to the user's key word, the search results are not directly pushed to the user as in the prior art, but filtered according to access heat of each content in the search results to obtain partial content whose access heat meets heat requirements and push it to the user, to reduce the number of pushed results and thereby reduce network resources consumed in pushing search results to the user, and save the user's network resources. It is appreciated that in the present embodiment, the search results are screened based on access heat, generally the content whose access heat meets the heat requirements belongs to content with higher value, the user only would like to click and view content with higher value, and content whose access heat does not meet the heat requirement generally belongs to content with lower value or without value. Therefore, the number of search results pushed to the user in the present embodiment is reduced, but the content pushed to the user all are content with higher value.

It is appreciated that the same processing may be performed for the search results obtained from each search during the real-time search. To facilitate depiction, the present embodiment presents detailed description by taking the current search results obtained from real-time search as an example.

Specifically, the search engine receives the user-input key word, and performs real-time search according to the user's key word to obtain the current search results; performs statistics of the access heat of each content in the current search results, and obtains from the current search results content whose access heat meets the heat requirements as the content to be pushed; and pushes the content to be pushed to the user.

Before performing the access heat of each content in the current search results, the search engine may judge whether the current search results have new content as compared with at least one search result before the current search results obtained by the search engine performing real-time search according to the user's key word; if the judgment result is yes, this means that the current search results have new content as compared with at least one previous search result. Since new content appears, it is determined that the current search results need to be pushed to the user so that the user obtains new content in time; on the contrary, if the judgment result is no, this means that the current search results do not have new content as compared with at least one previous search result, and means that the content in the current search results has already been pushed to the user during the previous pushing procedures. Therefore, it may be determined that the current search results may not be pushed to the user. This may save the user's network resources, lessen unpleasure caused by repeated pushing of the same content to the user, improve the user's experience, and meanwhile facilitate saving the processing resources of the search engine.

After it is determined that the current search results need to be pushed to the user, the search engine performs subsequent operations of performing statistics of the access heat of each content in the current search results and obtaining the content to be pushed according to the access heat and pushing the content to the user, thereby lessening the processing burden of the search engine and saving resources.

Furthermore, before judging whether the current search results have different new content as compared with at least one search result before the current search results, the search engine may perform deduplication processing for the at least one search result before the current search results. Said deduplication processing refers to removing the same content existing in each search result in at least one search result before the current search results. Deduplication may reduce the number of content compared with the current search results and facilitate lessening the processing burden of the search engine. For example, as for each search result, comparison may be performed according to the context of the key word to remove the repeated content (mainly webpages) in the search results.

It is appreciated that the at least one search result before the current search results may include all search results before the current search results, or may include partial search results before the current search results, for example may be the first search result. When the at least one search result before the current search results is the first search obtained by performing real-time search according to the user's key word, search results subsequently obtained from the real-time search are all compared with the first search result. If different new content appears, the flow shown in FIG. 1 will be executed to push the search result to the user.

In conjunction with the implementation mode of judging whether the current search results have new content as compared with at least one search result before the current search results, when it is judged that the current search results have new content as compared with at least one search result before the current search results, performing statistics of the access heat of each content in the current search results is specifically as follows: extracting from the current search results new content different from at least one previous search result, and performing statistics of the access heat of the new content. Only performing statistics of the access heat of the new content facilitates lessening the processing burden of the search engine and improving the statistics efficiency. Correspondingly, obtaining, from the current search results, the content whose access heat meets the heat requirements as the content to be pushed is specifically obtaining, from the new content, the content whose access heat meets the heat requirements as the content to be pushed.

In an optional implementation mode, the access heat of content in the search results may be reflected by a click rate. Based on this, performing statistics of the access heat of each content in the current search results is specifically performing statistics of the click rate of each content in the current search results. Correspondingly, the heat requirement may be a click threshold. If the click rate of the content in the search results is larger than the click threshold, it is believed that the content meets the heat requirement; on the contrary, it is believed that the content does not meet the heat requirement.

In an optional implementation mode, the access heat of content in the search results may be reflected by a read stay average duration. Based on this, performing statistics of the access heat of each content in the current search results is specifically performing statistics of the read stay average duration of each content in the current search results. Correspondingly, the heat requirement may be a read duration threshold. If the read stay average duration of the content in the search results is larger than the read duration threshold, it is believed that the content meets the heat requirement; on the contrary, it is believed that the content does not meet the heat requirement. The read stay average duration refers to an average value of read stay durations of all users clicking and reading the same content upon reading the content. The user's read stay duration for a certain content refers to a duration of stay on a page where the content lies after the user clicks the content.

In a further implementation mode, the access heat of content in the search results may be reflected by a click rate and a read stay average duration. Based on this, performing statistics of the access heat of each content in the current search results is specifically performing statistics of the click rate and the read stay average duration of each content in the current search results. Correspondingly, the heat requirement may be a click threshold and a read duration threshold. If the click rate of the content in the search results is larger than the click threshold and the read stay average duration upon reading the content is larger than the read duration threshold, it is believed that the content meets the heat requirement; in other cases, it is believed that the content does not meet the heat requirement.

The aforesaid heat requirement may be pre-configured locally at the search engine. Or, upon performing real-time search each time, the user inputs the key word and inputs an instruction to enable the search engine to determine the heat requirement. Based on this, the search engine performs real-time search according to the user-input key word, and determines the heat requirement according to the user-input instruction. For example, the search engine may display an optional heat requirement to the user according to the user's instruction for the user's selection; the search engine selects recommended content from the search results according to the heat requirement selected by the user.

As can be seen from the above, in the present embodiment, real-time search is performed according to the user's key word, a search result is pushed to the user, and the user may obtain the desired information in time. In this procedure, statistics is performed for the access heat of each content in the current search results, content whose access heat meets the heat requirement is obtained from the current search results and pushed to the user as the pushed content, and this is equivalent to screening the search results. This may reduce the number of search results pushed to the user, reduce network resources consumed in pushing the search result to the user, and facilitate the saving of the user's network resources.

As appreciated, for ease of description, the aforesaid method embodiments are all described as a combination of a series of actions, but those skilled in the art should appreciate that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

Figure 2:
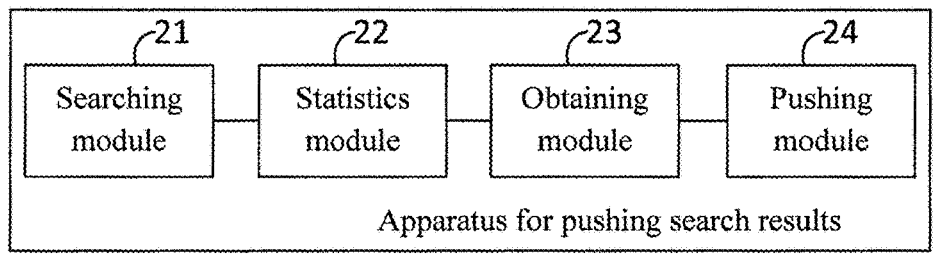
FIG. 2 is a block diagram of an apparatus for pushing search results according to an embodiment of the present disclosure.

FIG. 2 is a block diagram of an apparatus for pushing search results according to an embodiment of the present disclosure. As shown in FIG. 2, the apparatus comprises: a searching module 21, a statistics module 22, an obtaining module 23 and a pushing module 24.

The searching module 21 is configured to perform real-time search according to the user's key word to obtain current search results.

The statistics module 22 is configured to perform statistics of access heat of each content in the current search results obtained by the searching module 21.

The obtaining module 23 is configured to, from the current search results, content whose access heat obtained by the statistic module 22 meets heat requirements, as content to be pushed.

The pushing module 24 is configured to push the content to be pushed obtained by the obtaining module 23 to the user.

Figure 3:
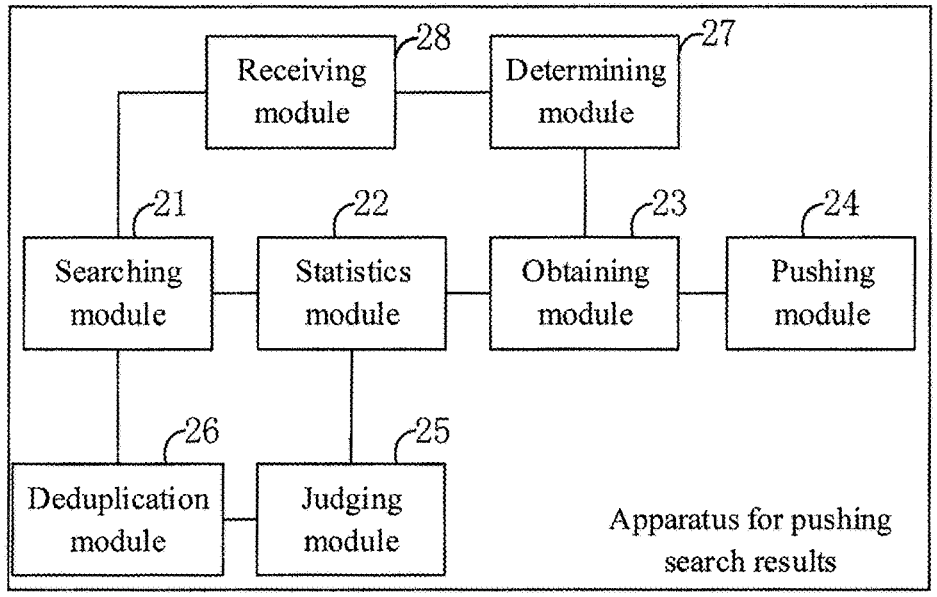
FIG. 3 is a block diagram of an apparatus for pushing search results according to another embodiment of the present disclosure.

In an optional implementation mode, as shown in FIG. 3, the apparatus further comprises a judging module 25.

The judging module 25 is configured to judge whether the current search results obtained by the searching module 21 have new content as compared with at least one search result before the current search results obtained by the searching module 21, and if the judgment result is yes, trigger the statistics module 22 to execute the operation of performing statistics of the access heat of each content in the current search results.

In an optional implementation mode, the statistics module 22 may be specifically configured to:

extract from the current search results new content different from at least one search result before the current search results;

perform statistics of the access heat of the new content.

Correspondingly, the obtaining module 23 is specifically configured to:

obtain, from the new content, the content whose access heat meets the heat requirements as the content to be pushed.

In an optional implementation mode, the apparatus further comprises a deduplication module 26.

The deduplication module 26 is configured to perform deduplication processing for the at least one search result before the current search results before the judging module 25 judges whether the current search results obtained by the searching module 21 have new content as compared with at least one search result before the current search results obtained by the searching module 21.

In an optional implementation mode, the at least one search result before the current search results is a first search result obtained by performing real-time search according to the user's key word.

In an optional implementation mode, the statistics module 22 may be specifically configured to execute at least one of the following operations:

perform statistics of a click rate of each content in the current search results;

perform statistics of a read stay average duration upon reading each content in the current search results.

In an optional implementation mode, as shown in FIG. 3, the apparatus further comprises a determining module 27.

The determining module 27 is configured to determine the heat requirement according to the user's instruction before the obtaining module 23 obtains, from the current search results, content whose access heat obtained by the statistics module 22 meets the heat requirements as the content to be pushed.

In an optional implementation mode, as shown in FIG. 3, the apparatus further comprises a receiving module 28.

The receiving module 28 is configured to receive the user-input key word and receive the user-input instruction before the searching module 21 performs real-time search according to the user's key word. The receiving module 28 is connected with the determining module 27 to provide the user's instruction to the determining module 27.

The apparatus for pushing the search result according to the present embodiment may be implemented a functional module in the search engine, or be independent on the search engine but connected with the search engine.

The apparatus for pushing the search result according to the present embodiment performs real-time search according to the user's key word and pushes a search result to the user, and the user may obtain the desired information in time. In this procedure, statistics is performed for the access heat of each content in the current search results, content whose access heat meets the heat requirement is obtained from the current search results and pushed to the user as the pushed content, and this is equivalent to screening the search results. This may reduce the number of search results pushed to the user, reduce network resources consumed in pushing the search result to the user, and facilitate the saving of the user's network resources.

Those skilled in the art can clearly understand that for purpose of convenience and brevity of depictions, reference may be made to corresponding procedures in the aforesaid method embodiments for specific operation procedures of the system, apparatus and units described above, which will not be detailed any more.

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, read-only memory (ROM), a random access memory (RAM), magnetic disk, or an optical disk.

Finally, it is appreciated that the above embodiments are only used to illustrate the technical solutions of the present disclosure, not to limit the present disclosure;

although the present disclosure is described in detail with reference to the above embodiments, those having ordinary skill in the art should understand that they still can modify technical solutions recited in the aforesaid embodiments or equivalently replace partial technical features therein; these modifications or substitutions do not make essence of corresponding technical solutions depart from the spirit and scope of technical solutions of embodiments of the present disclosure.

What is claimed is:

1. A method for pushing search results, wherein the method comprises:

performing repeatedly searches over time according to a user's same key word to obtain sequentially previous search results and current search results, wherein the previous search results correspond respectively to previous searches for the user's same key word while the current search results are obtained from the current search for the user's same key word;

removing repeated contents from the previous search results;
determining that the current search results have new content as compared with the previous search results, and extracting the new content from the current search results;
performing statistics of access heat of the new content in the current search results;
obtaining, from the new content of the current search results, content whose access heat meets heat requirements, as content to be pushed; and
pushing the content to be pushed to the user.

2. The method according to claim 1, wherein the previous search results comprise a first search result.

3. The method according to claim 1, wherein the performing statistics of access heat of the new content in the current search results comprises at least one of the following operations:
performing statistics of a click rate of the new content in the current search results;
performing statistics of a read stay average duration upon reading the new content in the current search results.

4. The method according to claim 1, wherein the obtaining, from the new content of the current search results, content whose access heat meets heat requirements, as content to be pushed, comprises:
determining the heat requirement according to the user's instruction.

5. An apparatus, comprising
one or more processors;
a memory;
one or more programs stored in the memory and configured to execute the following operation when executed by the one or more processors:
performing repeatedly searches over time according to a user's same key word to obtain sequentially previous search results and current search results, wherein the previous search results correspond respectively to previous searches for the user's same key word while the current search results are obtained from the current search for the user's same key word;
removing repeated contents from the previous search results;
determining that the current search results have new content as compared with the previous search results, and extracting the new content from the current search results;
performing statistics of access heat of the new content in the current search results;
obtaining, from the new content of the current search results, content whose access heat meets heat requirements, as content to be pushed; and
pushing the content to be pushed to the user.

6. The apparatus according to claim 5, wherein
the previous search results comprise a first search result.

7. The apparatus according to claim 5, wherein
the operation of performing statistics of access heat of the new content in the current search results comprises at least one of the following operations:
performing statistics of a click rate of the new content in the current search results;
performing statistics of a read stay average duration upon reading the new content in the current search results.

8. The apparatus according to claim 5, wherein
the operation of obtaining, from the new content of the current search results, content whose access heat meets heat requirements, as content to be pushed, comprises:
determining the heat requirement according to the user's instruction.

9. A non-volatile computer storage medium in which one or more programs are stored, an apparatus being enabled to execute the following operations when said one or more programs are executed by the apparatus:
performing repeatedly searches over time according to a user's same key word to obtain sequentially previous search results and current search results, wherein the previous search results correspond respectively to previous searches for the user's same key word while the current search results are obtained from the current search for the user's same key word;
removing repeated contents from the previous search results;
determining that the current search results have new content as compared with the previous search results, and extracting the new content from the current search results;
performing statistics of access heat of the new content in the current search results;
obtaining, from the new content of the current search results, content whose access heat meets heat requirements, as content to be pushed; and
pushing the content to be pushed to the user.

10. The non-volatile computer storage medium according to claim 9, wherein
the previous search results comprise a first search result.

11. The non-volatile computer storage medium according to claim 9, wherein
the operation of performing statistics of access heat of the new content in the current search results comprises at least one of the following operations:
performing statistics of a click rate of the new content in the current search results;
performing statistics of a read stay average duration upon reading the new content in the current search results.

12. The non-volatile computer storage medium according to claim 9, wherein
the operation of obtaining, from the new content of the current search results, content whose access heat meets heat requirements, as content to be pushed, comprises:
determining the heat requirement according to the user's instruction.

* * * * *